(12) United States Patent
Kim et al.

(10) Patent No.: US 11,648,798 B2
(45) Date of Patent: May 16, 2023

(54) WHEEL CENTER CAP ASSEMBLY

(71) Applicant: KUBOTA CORPORATION, Osaka (JP)

(72) Inventors: Min Sung Kim, Atlanta, GA (US); Akira Minoura, Osaka (JP); Kendall Peterman, Athens, GA (US)

(73) Assignee: KUBOTA CORPORATION, Osaka (JP)

( * ) Notice: Subject to any disclaimer, the term of this patent is extended or adjusted under 35 U.S.C. 154(b) by 785 days.

(21) Appl. No.: 16/534,396

(22) Filed: Aug. 7, 2019

(65) Prior Publication Data
US 2021/0039430 A1 Feb. 11, 2021

(51) Int. Cl.
| B60B 7/08 | (2006.01) |
| B60B 7/00 | (2006.01) |
| B60B 7/06 | (2006.01) |
| B60B 7/14 | (2006.01) |
| A01D 75/00 | (2006.01) |
| B60B 7/04 | (2006.01) |
| A01D 101/00 | (2006.01) |

(52) U.S. Cl.
CPC ............ *B60B 7/0013* (2013.01); *A01D 75/00* (2013.01); *B60B 7/04* (2013.01); *B60B 7/068* (2013.01); *B60B 7/08* (2013.01); *B60B 7/14* (2013.01); *A01D 2101/00* (2013.01)

(58) Field of Classification Search
CPC ................................ B60B 7/0013; B60B 7/08
See application file for complete search history.

(56) References Cited

U.S. PATENT DOCUMENTS

| 2,551,018 | A | | 5/1951 | Lambert | |
| 4,382,635 | A | * | 5/1983 | Brown | B60B 7/068 |
| | | | | | 301/37.35 |
| 5,286,092 | A | * | 2/1994 | Maxwell, Jr. | B60B 7/0013 |
| | | | | | 301/108.4 |
| 6,457,781 | B1 | * | 10/2002 | Cutcher | B60B 1/06 |
| | | | | | 301/37.373 |
| 6,682,151 | B1 | * | 1/2004 | Van Houten | B60B 7/12 |
| | | | | | 301/37.373 |
| 7,416,260 | B1 | * | 8/2008 | Cuevas | B60B 7/08 |
| | | | | | 301/37.11 |
| 9,199,508 | B2 | | 12/2015 | Kronemeyer et al. | |
| 10,486,461 | B1 | * | 11/2019 | Ivarsson | B60R 25/01 |
| 10,543,716 | B1 | * | 1/2020 | Mavrofrides | B60B 7/066 |
| 2003/0047987 | A1 | * | 3/2003 | Enomoto | B60B 1/08 |
| | | | | | 301/37.101 |
| 2005/0073192 | A1 | * | 4/2005 | Bruce | B60B 7/14 |
| | | | | | 301/37.373 |

(Continued)

FOREIGN PATENT DOCUMENTS

GB 2252944 A * 8/1992 ........... B60B 25/002

*Primary Examiner* — Scott A Browne
(74) *Attorney, Agent, or Firm* — Greenblum & Bernstein, P.L.C.

(57) ABSTRACT

A wheel center cap ASSY (assembly) for a work vehicle includes a center cap attached to a hub of a wheel coupled to an axle and having a center axis, an adaptor including a cap attachment portion to which the center cap is attached and a plurality of flange portions disposed on the outer side of and along a circumferential direction of the center cap, and a coupling member for coupling the flange portions to the hub.

11 Claims, 10 Drawing Sheets

(56) References Cited

U.S. PATENT DOCUMENTS

2014/0152078 A1\* 6/2014 Noriega ................. B60B 7/065
                                                    301/37.26
2017/0341463 A1\* 11/2017 Takeda ..................... B60B 7/04
2018/0186179 A1\* 7/2018 Chen ....................... B60B 3/142
2020/0361236 A1\* 11/2020 Chung ................. B60B 7/0013

\* cited by examiner

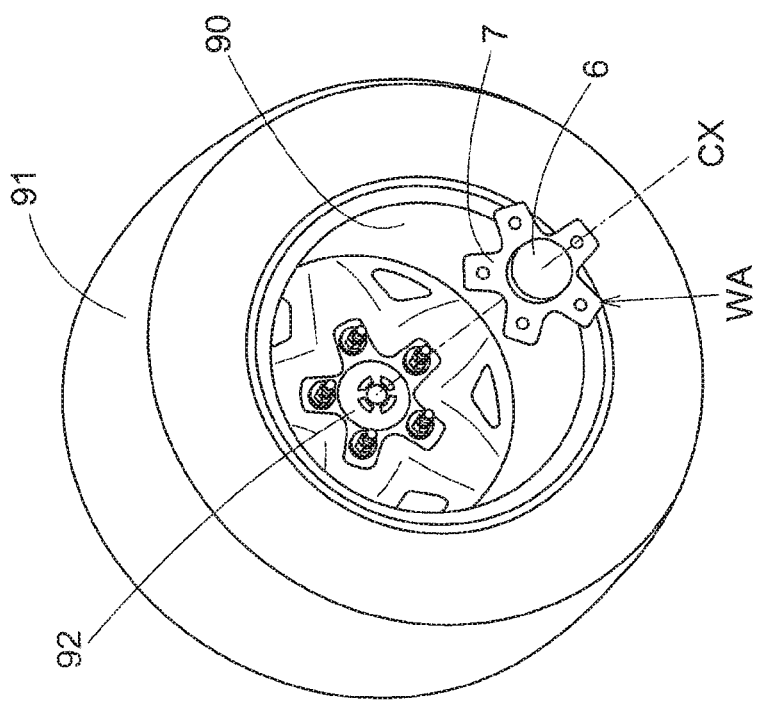
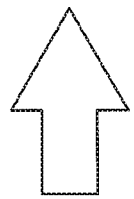
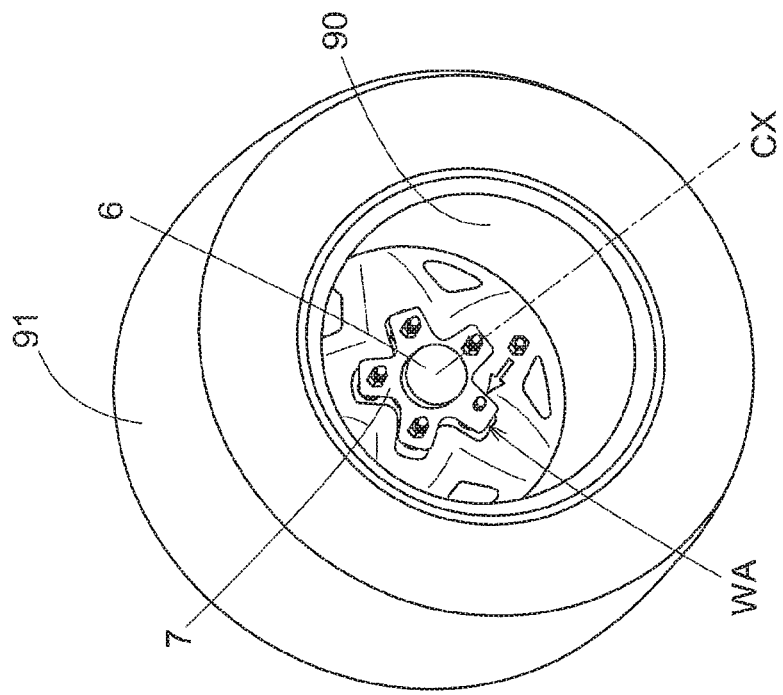
Fig.4

US 11,648,798 B2

WHEEL CENTER CAP ASSEMBLY

TECHNICAL FIELD

This invention relates to a wheel center cap "ASSY" (short for assembly) to be mounted to a hub of a wheel coupled to an axle of a work vehicle.

BACKGROUND ART

U.S. Pat. No. 2,551,018 document discloses a tire wheel for a lawnmower. This tire wheel includes a hub cap attached with screws to a wheel holding a rubber tire. This hub cap has a diameter that is approximately equal to the diameter of the wheel, thus covering the wheel entirely. An ornamental work, when provided on the surface of the hub cap, can provide the tire wheel as a whole with a distinguished appearance. However, the hub cap has the same size as the wheel, the cost of material and assembly is high, thus being impractical cost-wise.

U.S. Pat. No. 9,199,508 document discloses a wheel cover that is mounted via insertion of its tab to a flange of a truck wheel and held there by a spring. This wheel cover has an approximately same diameter as the wheel. So, the cost of material and assembly is high, thus being impractical cost-wise, again.

So, the costs of its material and working tends to be high, thus being inconvenient cost-wise, again.

SUMMARY OF INVENTION

The object of the present invention is to provide a wheel center cap assy (ASSY: assembly) that, despite its simple structure, allows easy attachment and effectively resists its inadvertent detachment.

According to an embodiment of a wheel center cap assembly (assy) for a work vehicle relating to the present invention, the wheel center cap assembly comprises:

a center cap attached to a hub of a wheel coupled to an axle, the center cap having a center axis;

an adaptor including a cap attachment portion to which the center cap is attached and a plurality of flange portions disposed on the outer side of and along a circumferential direction of the cap attachment portion;

a coupling member for coupling the flange portions to the hub;

the cap attachment portion being an uneven portion formed in a circumferential face of a through hole centered about the center axis; and a retention portion provided in an inner face of the center cap being elastically retained to the uneven portion.

With the wheel center cap assembly having the above-described arrangement, the center cap for covering an end face of the axle is attached to the adaptor that is coupled to the hub of the wheel. The attachment between the adaptor and the center cap is realized by elastic retention between the uneven portion formed in the circumferential face of the through hole of the adaptor and the retention portion provided in the inner face of the center cap. That is, the adaptor and the center cap together constitute a so-called "snap fastener". With this, the center cap can be readily attached to the adaptor and moreover cannot be detached therefrom easily.

According to a further embodiment of the wheel center cap assembly for a work vehicle relating to the present invention, the wheel center cap assembly comprises:

a center cap attached to a hub of a wheel coupled to an axle, the center cap having a center axis;

an adaptor including a plurality of flange portions disposed on a radially outer side from an outer circumference of the center cap;

the flange portion including a hub attachment portion for attachment to a shaft member that extends in the direction of the center axis from the hub; and the hub attachment portion including at least one retention piece to be elastically retained to a retention groove formed in the shaft member.

In the case of the wheel center cap assembly according to the former embodiment, the center cap and the adaptor are provided as separate entities. Whereas, in the case of the latter embodiment, the center cap and the adaptor are provided as an integrated (unitary) structure. Accordingly, attachment of the adaptor to the hub of the wheel via the shaft member extending from the hub realizes also attachment of the canter cap to the hub. The attachment between the shaft member and the adaptor is realized when the retention piece provided in the hub attachment portion of the adaptor is elastically retained in the retention groove formed in the shaft member. That is, the hub attachment portion of the adaptor and the shaft member of the hub together constitute a so-called "snap fastener". With this, the center cap, together with the adaptor, can be readily attached to hub and moreover cannot be detached therefrom easily.

BRIEF DESCRIPTION OF THE DRAWINGS

FIG. 4 is a perspective view showing a wheel center cap assy before and after its attachment to a rear wheel.

DETAILED DESCRIPTION

Figure 1:
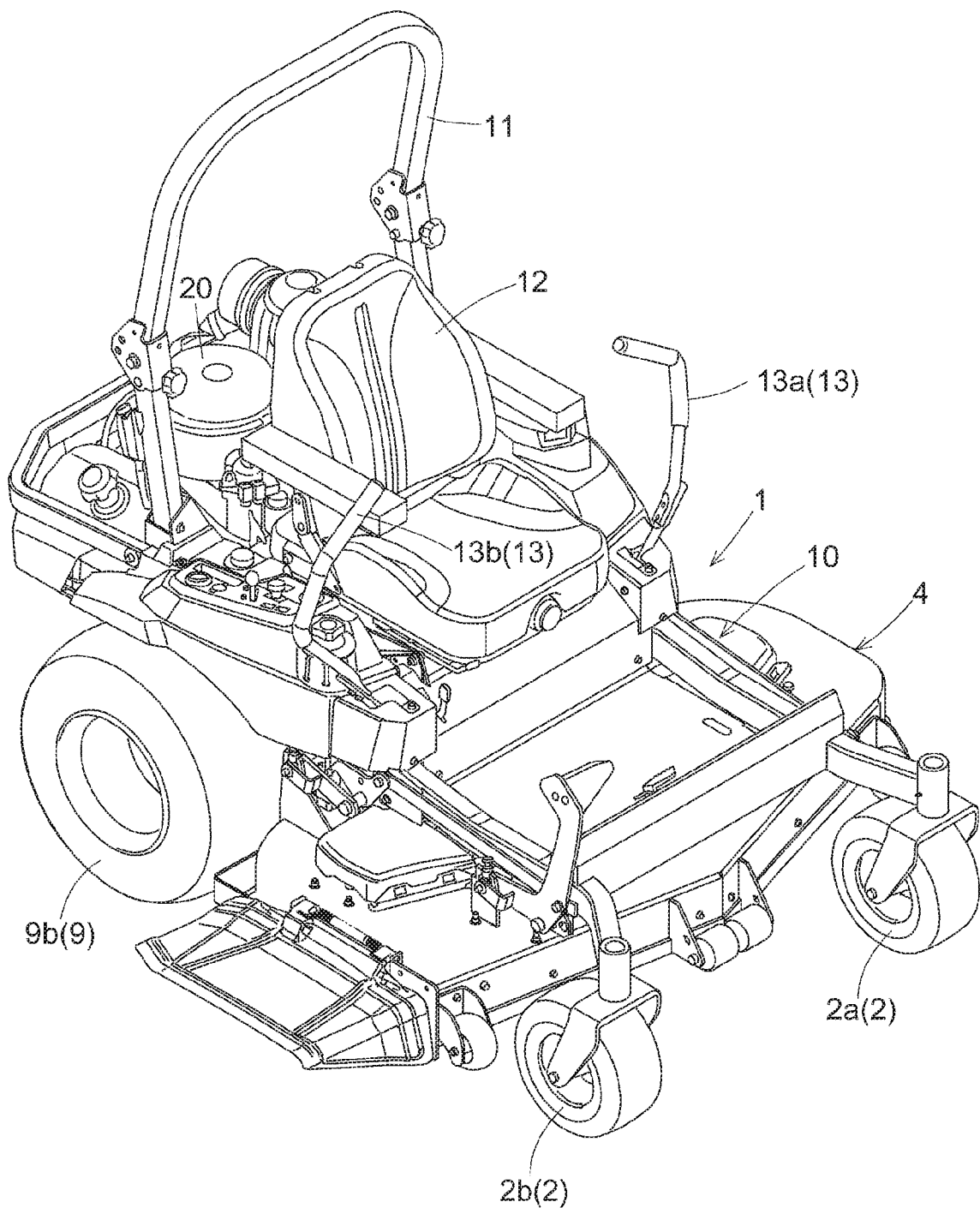
FIG. 1 is a perspective view of a lawnmower.

Next, a lawnmower as one embodiment of a work vehicle relating to the present invention will be explained with reference to the accompanying drawings. FIG. 1 is a perspective view of the lawnmower. Incidentally, in this detailed description, unless indicated explicitly otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

The lawnmower includes a vehicle body 1 that is supported on the ground surface via a front wheel unit 2 as a caster unit and a rear wheel unit 9 as a traveling device. This lawnmower is a so-called zero-turn mower with a left rear wheel 9*a* and a right rear wheel 9*b* together constituting the rear wheel unit 9 being independently speed-controlled in the forward and reverse directions. The front wheel unit 2 includes a pair of left and right front wheels 2*a*, 2*b*. The principal component of the vehicle body 1 is a frame 10 formed of angular pipe members, and the like. Between the front wheel unit 2 and the rear wheel unit 9, a mower unit 4 as a utility implement is suspended from the frame 10 to be liftable up/down.

The frame 10 extends in a front/rear direction and at a center portion of this frame 10, a driver's seat 12 is provided. On the upper face of the front portion of the frame 10, there is laid a floor plate for use as a "footrest" for the driver. Rearwardly of the driver's seat 12, an arch-shaped ROPS 11 is mounted vertically.

An engine 20 for providing rotational power to the rear wheel unit 9 and the mower unit 4 is mounted on a rear portion of the frame 10. This engine 20 consumes fossil fuel such as heavy oil, gasoline, etc.

A maneuvering unit 13 as one user operable device consists of a left maneuvering lever 13*a* disposed on the left side of the drive's seat 12 and a right maneuvering lever 13*b* disposed on the right side of the driver's seat 12. The left maneuvering lever 13*a* is used for adjusting a rotational speed of the left rear wheel 9*a*. The right maneuvering lever 13*b* is used for adjusting a rotational speed of the right rear wheel 9*b*. And, the left maneuvering lever 13*a* and the right maneuvering lever 13*b* are respectively operable over and across a forward traveling speed changing range, a neutral and a reverse traveling speed changing range.

Figure 2:
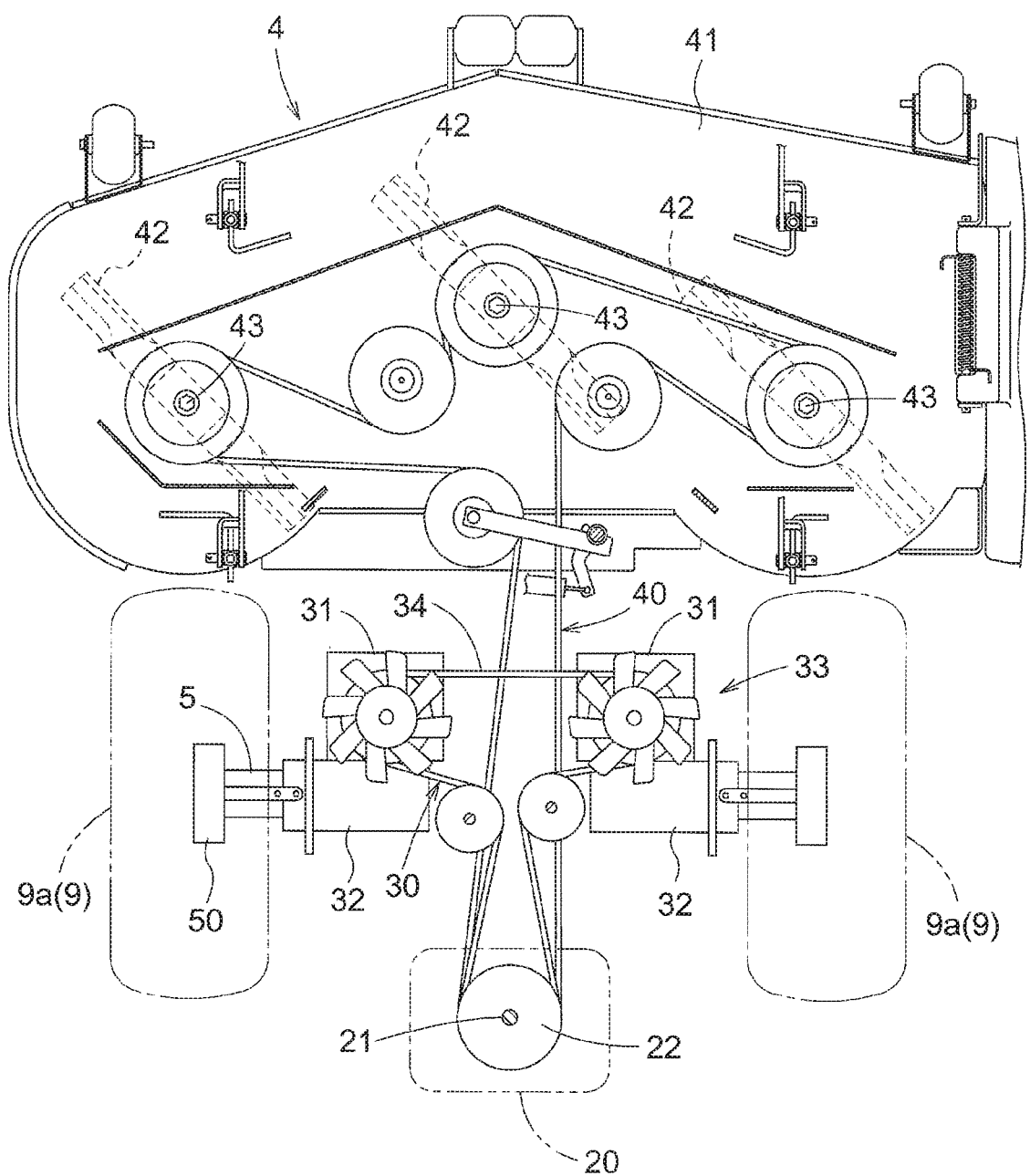
FIG. 2 is a power system diagram of the lawnmower.

As can be seen from the power system diagram shown in FIG. 2 the power transmission system of this lawnmower includes a traveling transmission mechanism 30 for transmitting engine power to the rear wheel unit 9 and a PTO mechanism 40 for transmitting engine power to the mower unit 4. Power from the engine 20 is outputted via upper and lower two-staged output pulleys 22 attached to an engine output shaft 21.

The traveling transmission mechanism 30 includes a pair of left and right HST's (hydrostatic transmissions) 31, a pair of left and right gear units 32 and a traveling belt transmission mechanism 33. The traveling belt transmission mechanism 33 transmits power, which has been speed-changed via the HST's 31, to axles 5. The axles 5 are operably coupled to the rear wheel unit 9 (the left rear wheel 9*a*, the right rear wheel 9*b*) as the driving rear wheels.

Speed changing operations of the left and right HST's 31 are effected in response to control signals generated based on pivotal operations of the left maneuvering lever 13*a* and the right maneuvering lever 13*b* respectively. More particularly, in response to user operations on the left maneuvering lever 13*a* and the right maneuvering lever 13*b*, a stopped state, a straight traveling state, a gentle turning state, a pivot turning stage and a spin turning state can be realized respectively. The stopped state is realized by stopping the left rear wheel 3*a* and the right rear wheel 3*b*. The straight traveling state is realized by driving the left rear wheel 3*a* and the right rear wheel 3*b* at an equal speed forwardly or reversely. The gentle turning state is realized by driving the left rear wheel 3*a* and the right rear wheel 3*b* at different speeds forwardly or reversely. The pivot turning state is realized by stopping the left rear wheel 3*a* or the right rear wheel 3*b* and driving the other wheel forwardly or reversely. The spin turning state is realized by driving the left rear wheel 3*a* or the right rear wheel 3*b* forwardly and driving the other wheel reversely.

The mower unit 4 includes a mower deck 41 which is provided in form of a downwardly opened box. In the inside space of the mower deck 41, as indicated by dotted lines in FIG. 2, there are mounted three blades 42 disposed side by side in the vehicle body transverse direction. Each blade 42 is fixed to a drive shaft 43 which is rotatably supported via a bearing to a top plate of the mower deck 41. The PTO mechanism 40 is consists of a pulley-belt system configured to transmit power to the respective drive shafts 43 from the output pulleys 22 of the engine 20.

Figure 3:
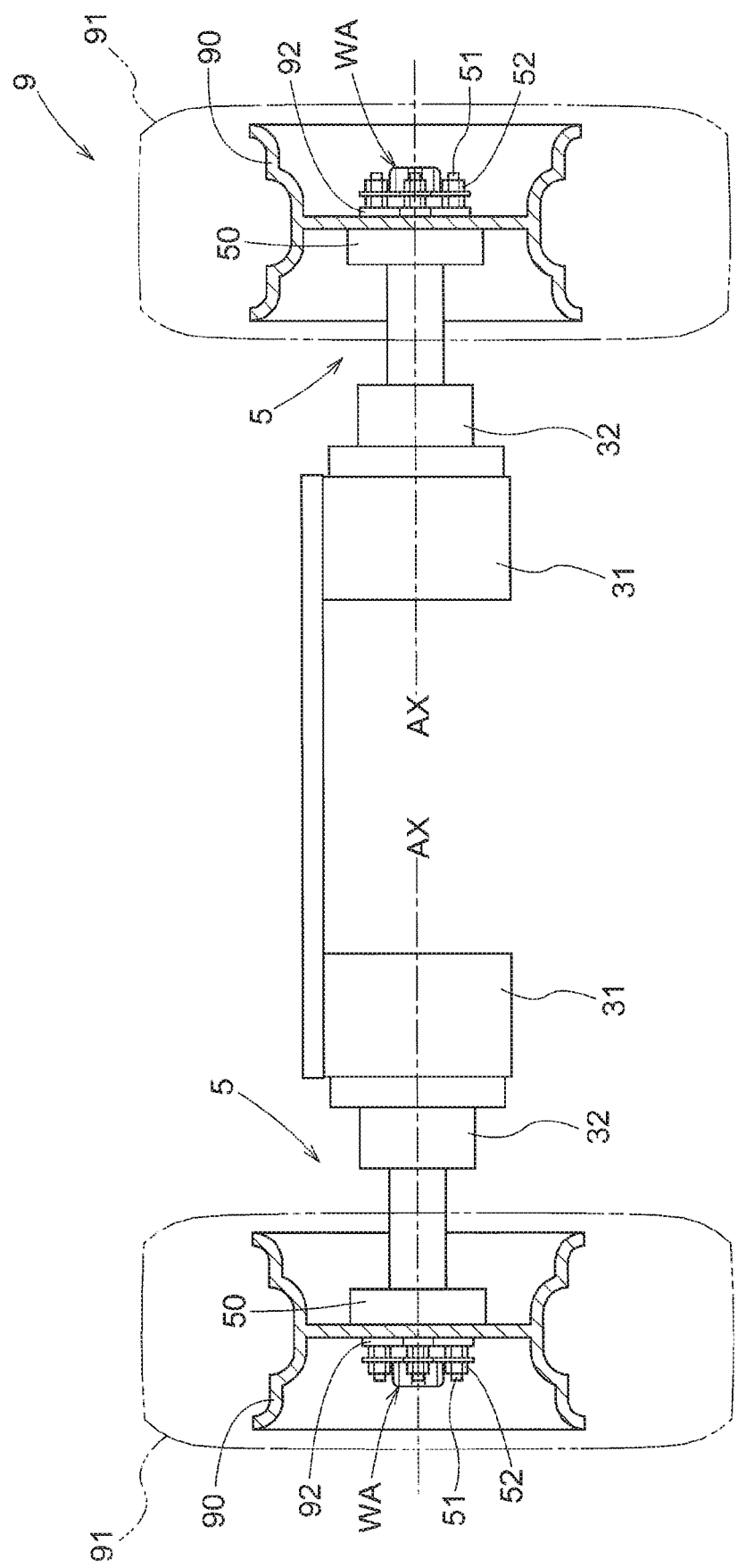
FIG. 3 is a front view which schematically shows HST's, axles and rear wheels.

FIG. 3 shows a coupling arrangement between the axle 5 and the rear wheel unit 9. At the leading end region of the axle 5 which drives the rear wheel unit 9, there is provided an axle flange 50 for use in operably coupling the axle 5 to a wheel 90 of the rear wheel unit 9. The axle flange 50 is provided with five threaded shaft members 51, as "coupling members", which are evenly distributed around and extend along an axis AX of the axle 5. Each threaded shaft member 51 is inserted into a coupling hole provided in the hub 92 of the wheel 90, and the wheel 90 is fixed by fastening to the axle flange 50 with a nut 52.

Figure 5:
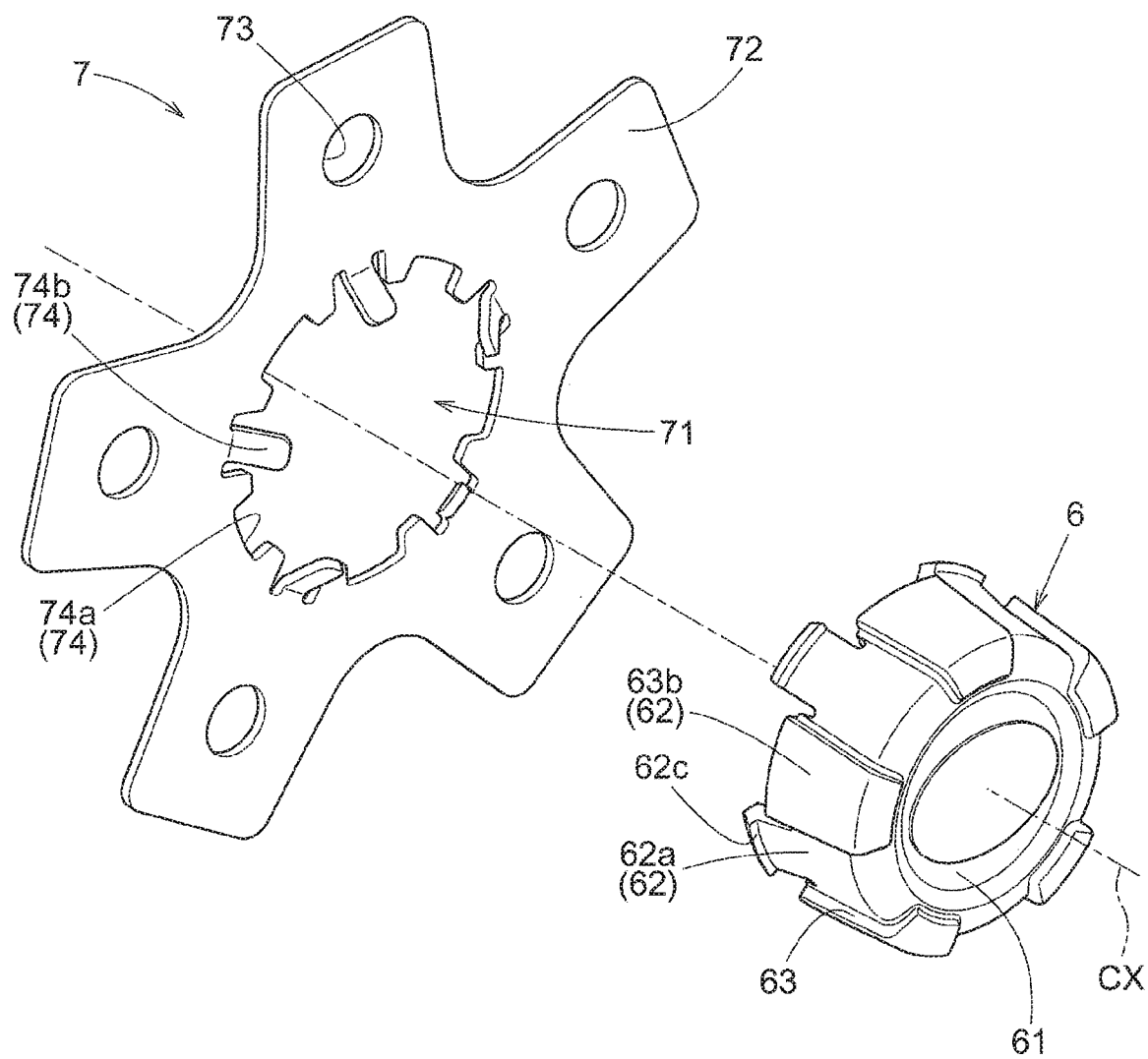
FIG. 5 is a development view showing an embodiment of a wheel center cap assy.

As shown in FIG. 4, the terminal end of the axle 5 is covered by a wheel center cap assy WA attached to an outer face of the hub 92. As shown in FIG. 5, the wheel center cap assy WA includes a cylindrical center cap 6 having a center axis CX and a plat-like adaptor 7 having the center axis CX. Incidentally, the center axis CX is to be placed coaxial with the axis AX of the axle 5 when the wheel center cap assy WA is fixed to the wheel 90.

At the center of the adaptor 7, there is formed a through hole 71 centering around the center axis CX. In the outer circumference of the adaptor 7, five tongue pieces extending in the radial direction are formed equidistantly in the circumferential direction. These tongue pieces consist of flange portions 72 for use in attachment of the adaptor 7 to the axle flange 50. Therefore, each flange portion 72 defines a bolt hole 73 at a position that allows insertion therethrough of the shaft member 51 (see FIG. 3) extending from the axle flange 50 through the hub 92 of the wheel 90.

In the circumferential face of the through hole 71 of the adapter 7, there is formed an uneven portion 74 as a "cap attachment portion" to which the center cap 6 is to be attached. This uneven portion 74 consists of rectangular receded portions 74*a* and protruding pieces 74*b* which extend obliquely toward the center axis CX. The rectangular receded portions 74*a* and the protruding pieces 74*b* are formed by a predetermined pitch in the circumferential face of the through hole 71.

Figure 6:
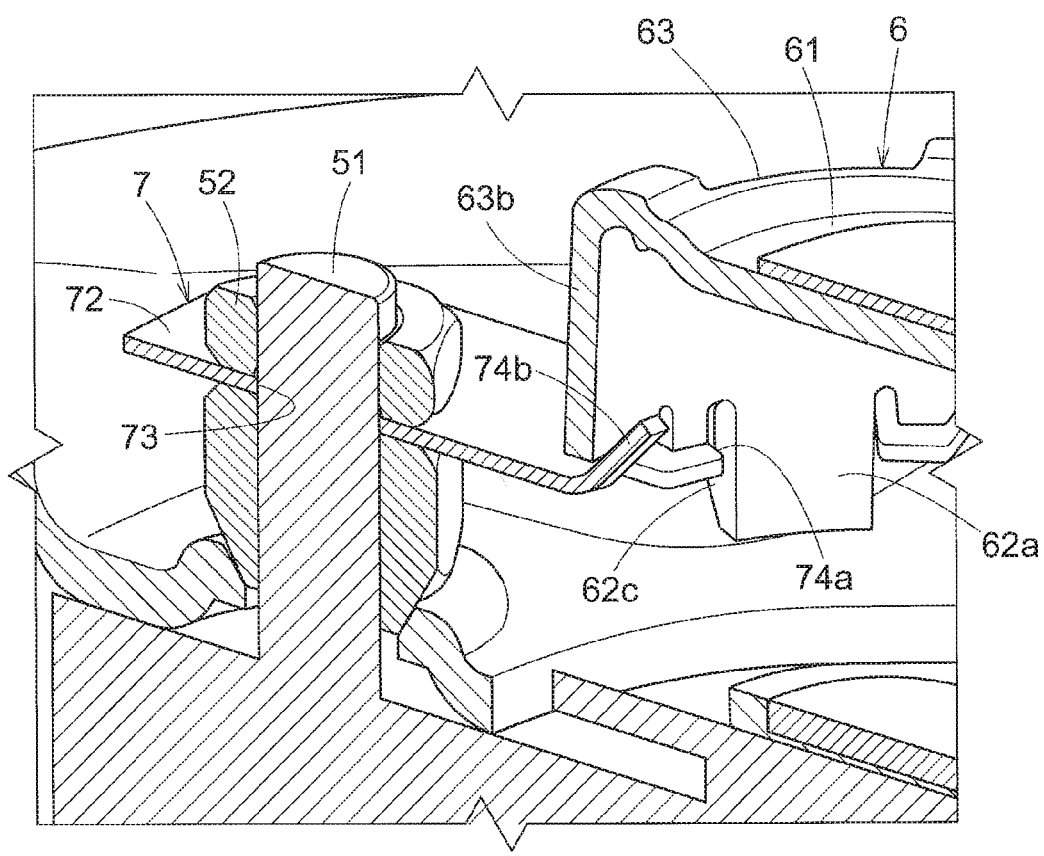
FIG. 6 is a partial section view showing a portion of the wheel center cap assy.

The center cap 6 consists of a top wall 61 in which an emblem or the like can be stamped and a side wall 62. The side wall 62 consists of a thin first side wall piece 62*a* and a thick second side wall piece 63*b* which are sectioned from each other in the circumferential direction by an axially extending step 63. The first side wall piece 73*a* extends longer than the second side wall piece 63*b*, each having a shape which can be readily bent in the radial direction of the center axis CX. At the leading end of the first side wall piece 62*a*, a retention portion 62*c* is formed. In the instant embodiment, the retention portion 62*c* is a retention piece having a hook at its leading end. This retention piece (retention portion 62*c*) is configured to be elastically deformable in the radial direction of the center axis CX. Further, the distance from the outer edge of the hook formed at the retention piece to the center axis is set longer than the distance of the corresponding receded portion of the uneven portion to the center axis. Thus, this retention portion 62c, when fitted in the uneven portion 74, more particularly, in the rectangular receded portion 74a, of the adaptor 7 as shown in FIG. 6, is elastically retained to the uneven portion 74. Namely, the rectangular receded portion 74a and the retention portion 62c together constitute a "snap fastener".

Further, as shown in FIG. 6, when the center cap 6 is attached to the adaptor 7, the protruding piece 74b is placed in abutment against the inner face of the second side wall piece 63b in such a manner to press this second side wall piece 63b to the outer side. The arrangement serves to increase the retention force provided from the uneven portion 74 to the center cap 6.

Figure 7:
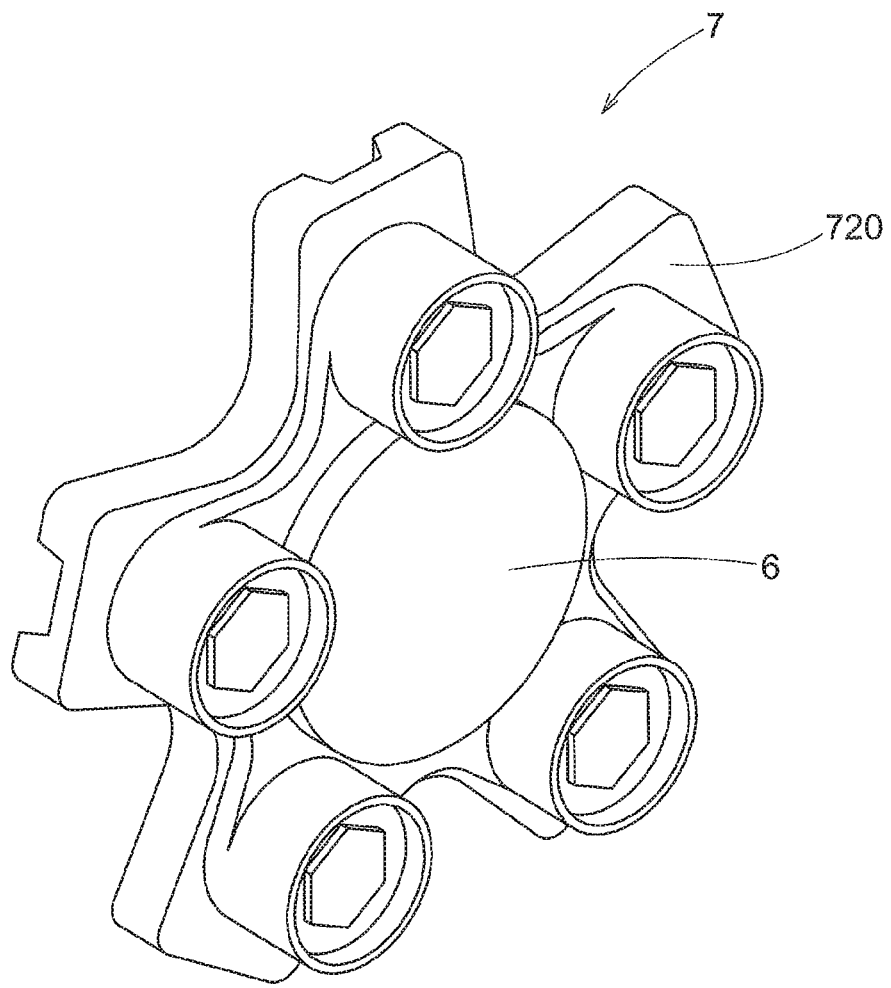
FIG. 7 is a perspective view showing a first further embodiment of the wheel center cap assy.
Figure 8:
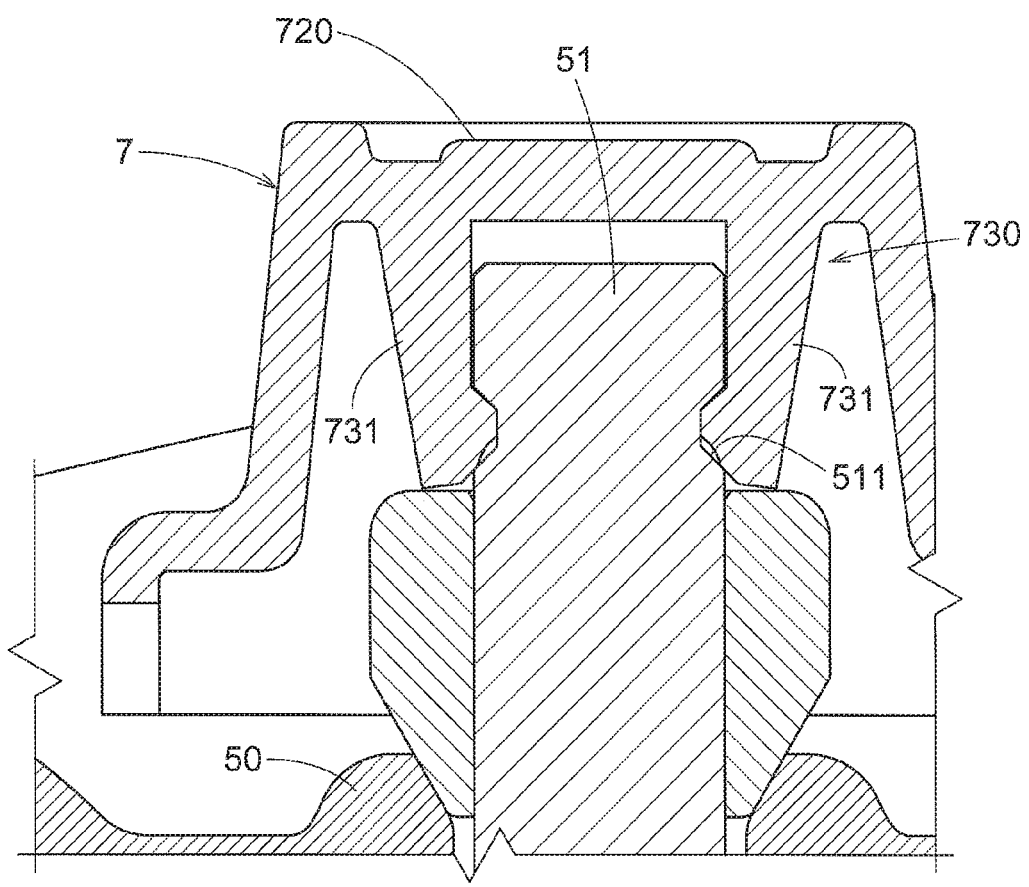
FIG. 8 is a section view showing the first further embodiment of the wheel center cap assy.
Figure 9:
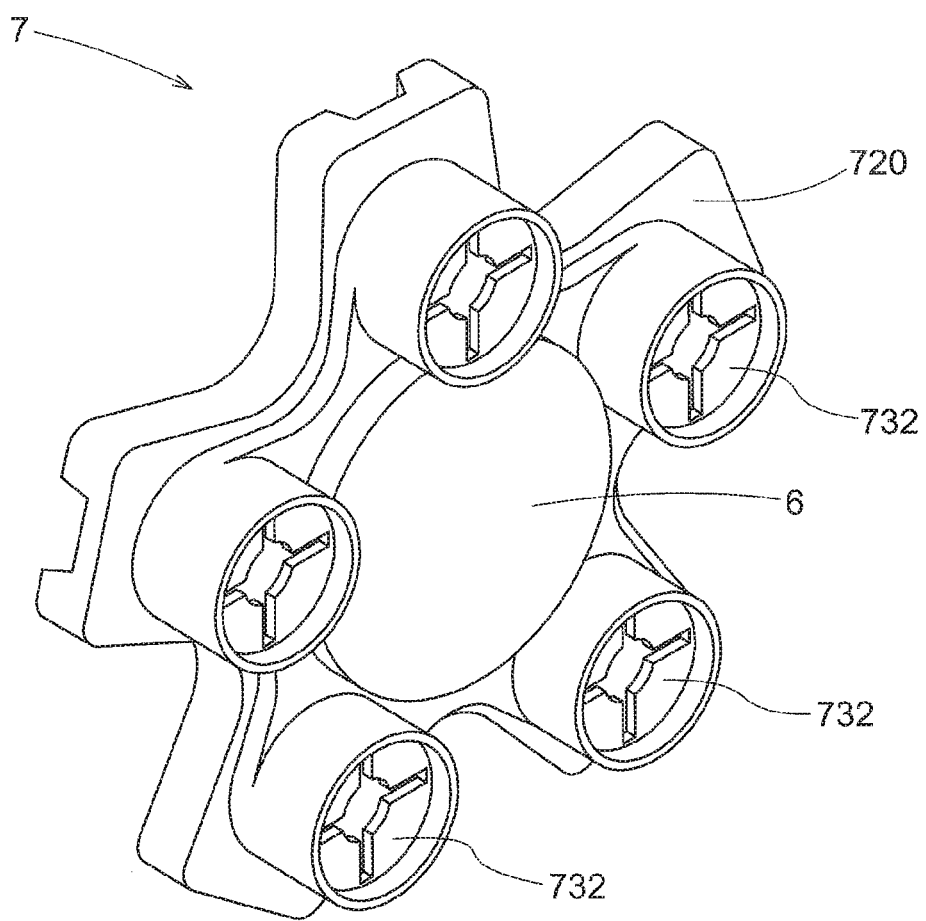
FIG. 9 is a perspective view showing a second further embodiment of the wheel center cap assy.
Figure 10:
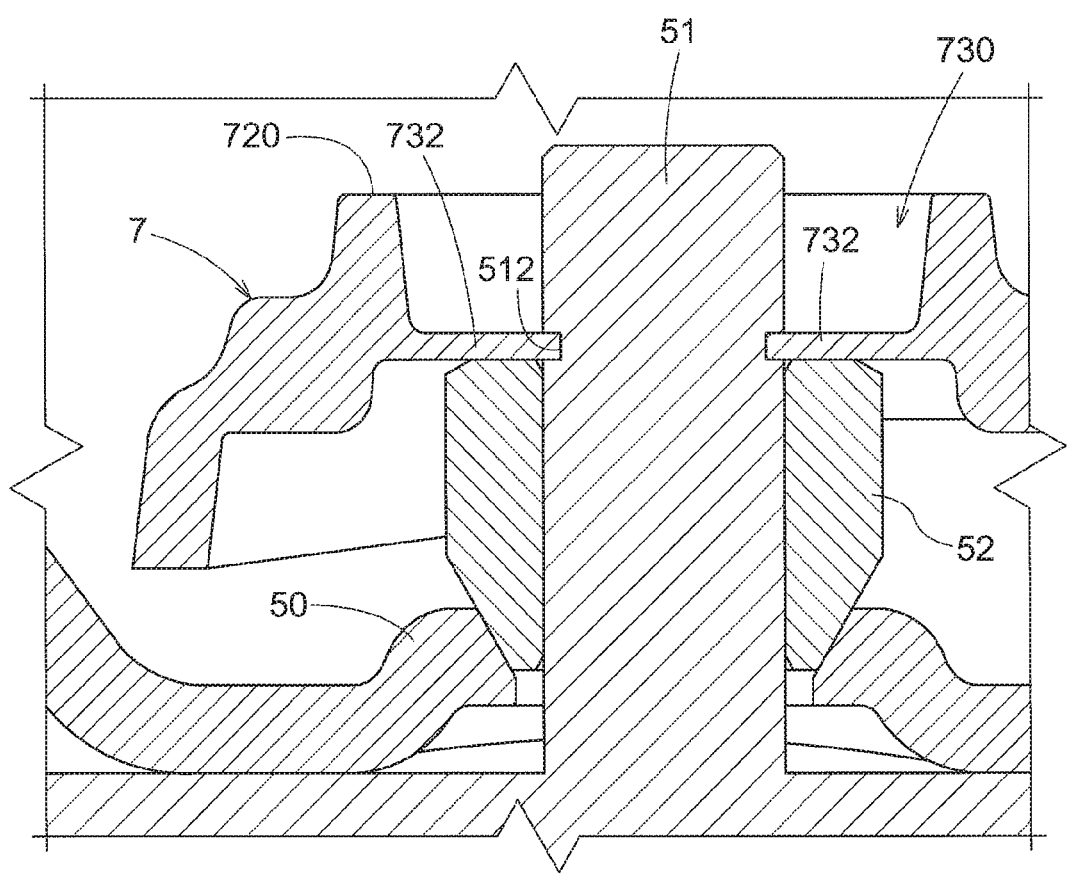
FIG. 10 is a section view showing the second further embodiment of the wheel center cap assy.

FIGS. 7 through 10 illustrate a further embodiment of the wheel center cap assy WA. In this wheel center cap assy WA, a center cap 6 and an adaptor 7 are formed as an integrated (unitary) structure. Namely, the main body of this wheel center cap assy WA consists of the center cap 6 having the center axis CX and the adaptor 7 that protrudes radially outwards from the outer circumference of the center cap 6. As shown in FIG. 8 and FIG. 10, the adaptor 7 consists of five flange portions 720 which extend in the radially direction from the center cap 6. In each flange portion 720, there is formed a cup-shaped hub attachment portion 730 for receiving the leading end region of the shaft member 51 of the axle flange 50. When the adaptor 7 is attached to the hub 92 of the wheel 90, the center cap 6 too will be retained at a position where its center axis CX is in substantial agreement with the axis AX of the axle 5.

Next, there will be explained differences between a first further embodiment of the wheel center cap assy WA shown in FIG. 7 and FIG. 8 and a second further embodiment of the wheel center cap assy WA shown in FIG. 9 and FIG. 10.

In the first further embodiment, as shown in FIG. 8, the cup-shaped hub attachment portion 730 includes four vertical retention pieces 731 that extend along the shaft member 51 from the face opposed to the leading end of the shaft member 51, i.e. along the axial direction of the center axis CX. At the leading end of each vertical retention piece 731, a hook is formed. Prior to the attachment (natural state), the diameter of the contour circle delimited by the four hooks is shorter than the diameter of the shaft member 51, so, at the time of attachment, these hooks will enter a retention groove 511 formed in the shaft member 51, thus being elastically retained therein. To this end, the vertical retention piece 731 is provided as bendable cantilever arm whose section progressively decreases from the base end toward the leading end.

In the second further embodiment, a shown in FIG. 10, the cup-shaped hub attachment portion 730 includes four horizontal retention pieces 732 which extend from the circumferential wall toward the shaft member 51, i.e. in the direction perpendicular to the axial direction of the center axis CX. Each horizontal retention piece 732 has a plate shape which is like a fan extending over 90 degrees, with its free end being cut away in the form of an arc following the shaft member 51. Prior to the attachment (natural state), the diameter of the contour circle delimited by the free ends of the four horizontal retention pieces 732 is shorter than the diameter of the shaft member 51, so, at the time of attachment, these hooks will enter a retention groove 512 formed in the shaft member 51, thus being elastically retained therein.

In the foregoing embodiment, a lawnmower is employed as a work vehicle. In addition, the present invention is applicable also to other work vehicles such as a snowplow vehicle etc.

In the meantime, the arrangements disclosed in the foregoing embodiment (including the further embodiments) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

The invention claimed is:

1. A wheel center cap assembly for a work vehicle, comprising:
   a center cap attached to a hub of a wheel coupled to an axle, the center cap having a center axis;
   an adaptor including a cap attachment portion to which the center cap is attached and a plurality of flange portions disposed on the outer side of and along a circumferential direction of the cap attachment portion;
   a coupling member for coupling the flange portions to the hub;
   the cap attachment portion being an uneven portion formed in a circumferential face of a through hole centered about the center axis including a plurality of protruding portions that partly define the through hole, and the plurality of protruding portions extend in a plurality of distances toward the center axis; and
   a retention portion provided in an inner face of the center cap being elastically retained to the uneven portion.

2. The wheel center cap assembly of claim 1, wherein:
   the retention portion comprises a retention piece that extends along the center axis and forms a hook at its leading end, the retention piece being elastically deformable in the radial direction of the center axis; and
   a distance from an outer edge of the hook is set longer than a distance of a corresponding receded portion of the uneven portion to the center axis.

3. A wheel center cap assembly for a work vehicle configured to be attached to a hub of a wheel coupled to an axle, comprising:
   an adaptor including a center cap having a center axis and a plurality of flange portions disposed on a radially outer side from an outer circumference of the center cap;
   each flange portion, among the plurality of flange portions, including a hub attachment portion for attachment to a shaft member that extends in the direction of the center axis from the hub; and
   the hub attachment portion including at least one retention piece to be elastically retained to a retention groove formed in the shaft member,
   wherein the retention piece extends in the axial direction of the center axis with its outer diameter continuously decreasing from its base end to its leading end.

4. The wheel center cap assembly of claim 3, wherein the retention piece extends in the axial direction of the center axis and forms, at a leading end thereof, a hook that can be fitted in the retention groove.

5. The wheel center cap assembly of claim 3, wherein:
   the retention piece extends in the radial direction of the center axis; and a diameter of a contour circle delimited by leading ends of a plurality of the retention pieces is shorter than a diameter of the shaft member.

6. The wheel center cap assembly of claim 1, wherein the uneven portion includes a plurality of recessed portions that are recessed in the radial direction of the center axis.

7. The wheel center cap assembly of claim 6, wherein the plurality of recessed portions are evenly distributed around the uneven portion along a circumferential direction of the uneven portion.

8. The wheel center cap assembly of claim 1, wherein the uneven portion includes a plurality of protruding pieces that extend obliquely towards the center axis.

9. The wheel center cap assembly of claim 6, wherein the uneven portion includes a plurality of protruding pieces that extend obliquely towards the center axis.

10. The wheel center cap assembly of claim 8, wherein the center cap includes a side wall portion that is configured to abut against a protruding piece of the uneven portion, among the plurality of protruding pieces, such that the protruding piece presses the side wall portion away from the center axis.

11. The wheel center cap assembly of claim 9, wherein the center cap includes a side wall portion that is configured to abut against a protruding piece of the uneven portion, among the plurality of protruding pieces, such that the protruding piece presses the side wall portion away from the center axis.

* * * * *